June 14, 1966  D. O. NOORLANDER  3,255,776
MILKING MACHINE PULSATOR
Filed Feb. 6, 1963
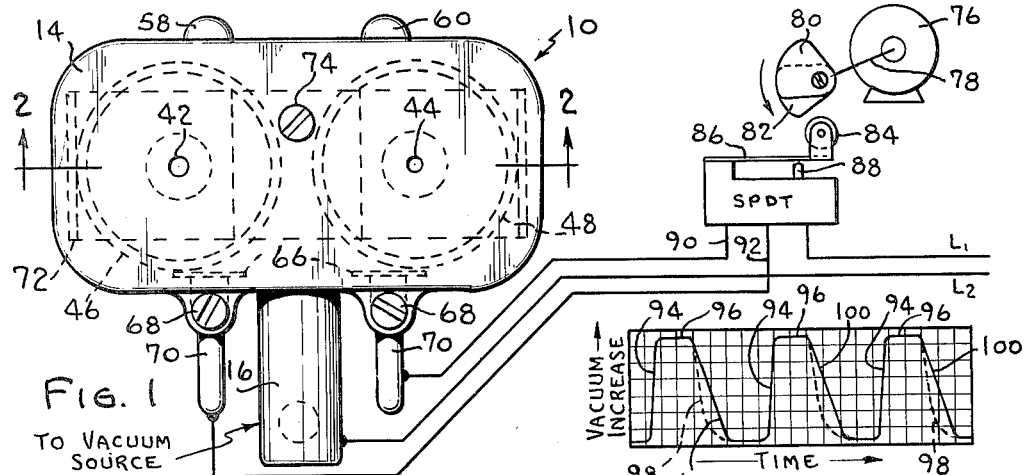
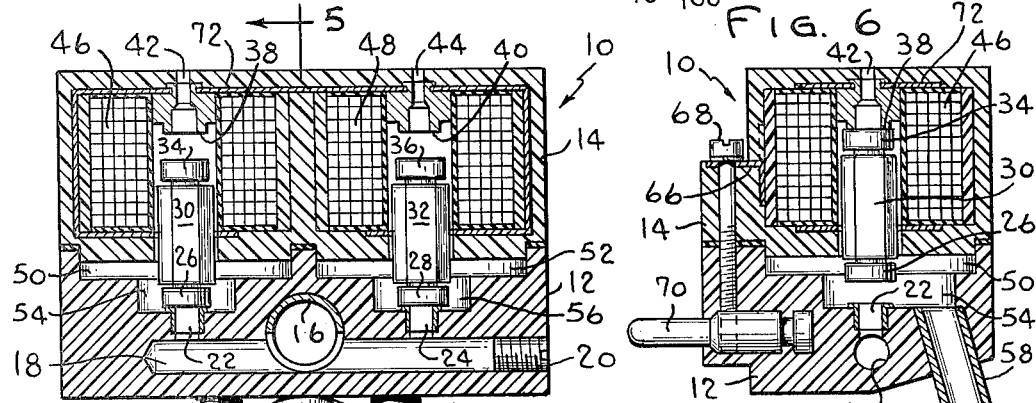
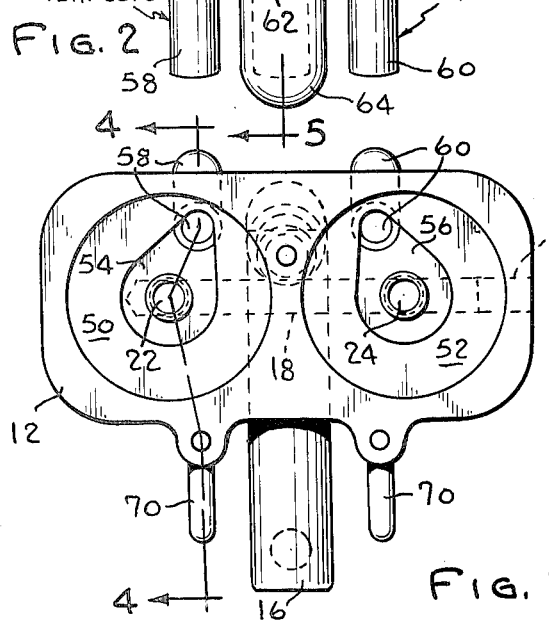
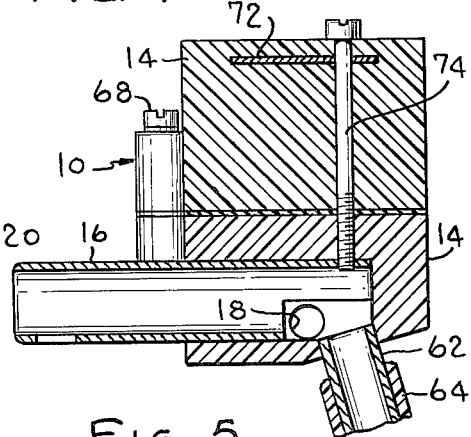
INVENTOR.
DANIEL O. NOORLANDER
BY Bayard H. Michael
ATTORNEY

United States Patent Office 3,255,776
Patented June 14, 1966

3,255,776
MILKING MACHINE PULSATOR
Daniel O. Noorlander, Madison, Wis., assignor to Dairy Equipment Company, Madison, Wis., a corporation of Wisconsin
Filed Feb. 6, 1963, Ser. No. 256,574
4 Claims. (Cl. 137—624.17)

This invention relates to pulsators used with milking machines.

While there are many types of pulsators now on the market they all have what I feel to be defect in that they permit of a substantial variation in the vacuum inside the teat cup inflation. Thus, when the pulsator opens to atmosphere to allow the inflation to collapse the vacuum drops off inside the inflation to such an extent that the inflation frequently will not collapse. This results in the teat being subjected to continuous, though varying, vacuum which results in congestion of the teat and also allows the milk to backwash over the teat. The first condition can predispose the teat to mastitis while the second condition can be the way in which the infection is introduced to the teat.

One object of this invention is to provide a pulsator which tends to stabilize the vacuum at the teat cup. This is accomplished by providing one pulsating system for the front teats and another system for the rear teats and alternating the venting of the two systems so the amount of air vented into the vacuum line is more constant. A pulsator which vents all teat cups at once can give rise to 6–8 inches (Hg) variation in vacuum while the present pulsator in the same system will give rise to only about 1" variation.

Another objection to prior pulsators is that they milk all teats the same whereas studies show the rear teats contain 60% of the milk. Therefore, to finish milking the rear teats the front teats are milked dry for an appreciable period. This also is bad for the animal.

A further object of this invention is to provide a pulsator which can be adjusted to milk the rear teats faster than the front teats so all teats will be finished at the same time. To accomplish this I provide a simple timer which can be adjusted to vary the milking time of the front and rear teats by adjusting the percentage of time that the two pulsator valves are operated.

With an alternate action pulsator it would appear that increasing the milking time of one pair of teat cups would necessitate a corresponding decrease in milking time of the other pair. A further object of this invention is to provide means for increasing the milking time of one pair with respect to the time the corresponding solenoid is energized. This is done by adjusting the size of the air vent to decrease the rate of loss of vacuum when the cup is vented. Specifically, where the pulsator is adjusted to give a 60-40 (rear and front) ratio it is sometimes desirable to provide a smaller vent for the front teat system to somewhat increase the effective milking time on the front teats without decreasing the time on the rear teats.

A further object is to provide a pulsator which can be washed in place to flush out the system and to clean the vents. Keeping the vents clean has been a problem in the past but with this pulsator the vents can be cleaned by ejecting water through the vents. To make such a system practical it is necessary to have the pulsator electrically safe when wet and the present pulsator has the coils encapsulated to prevent any possible shorting.

Other objects and advantages will be pointed out in, or be apparent from, the specification and claims, as will obvious modifications of the single embodiment shown in the drawings, in which:

FIG. 1 is a top plan view of the present pulsator with the control therefor represented in schematic form;

FIG. 2 is a vertical section taken as indicated by line 2—2 in FIG. 1;

FIG. 3 is a plan view of the lower half of the pulsator with the coil section removed;

FIG. 4 is a vertical section taken as indicated by the meandering line 4—4 on FIG. 3;

FIG. 5 is a vertical section taken as indicated by line 5—5 on FIG. 2; and

FIG. 6 is a graph showing the manner in which the orifice size can be employed to increase the effective milking time.

The present pulsator is housed in a body 10 having a lower portion 12 to which the upper portion 14 is connected. The bottom part of the body is fabricated of plastic and has a vacuum connection tube 16 mounted therein to communicate with the cross bore 18 which is plugged by plug 20. The cross bore, in turn, communicates with the vertical passages 22, 24, the upper ends of which form valve seats against which the resilient valves 26, 28 will seat when the ferromagnetic armatures 30, 32, which respectively carry the valves, are in their lower positions as illustrated in FIG. 2. The upper end of each armature 30, 32 is provided with a resilient valve 34, 36 which are respectively adapted to close or seat on the valve seats 38, 40 to block flow through the vent passages 42, 44 when the coils 46, 48 are energized (FIG. 4).

Each armature 30, 32 is designed, therefore, to connect the corresponding chamber 50, 52 to atmospheric pressure through the vents 42, 44 or to vacuum through the passages 22 and 24. The lower portion of each chamber 50, 52 is provided with a depressed area 54, 56 to provide communication between the vacuum ports 22, 24 and the conduits 58 and 60 mounted in the plastic body and respectively adapted for connection to the rear and front teat cups of the usual milking machine. It will be noted that the vacuum side of the pulsator is provided with an additional connector 62 which is shown capped by a plastic cover 64 but which can be used for connection to the claw or any other portion of a milking system which may be desirable under vacuum.

It will be noted the two coils 46, 48 are encapsulated in plastic, such as epoxy, and the coil leads are brought out through the brackets 66 through which the body screws 68 pass, as seen in FIG. 4, to contact the prong type terminals 70. The other lead of each coil can be grounded to the frame 72 through which a third body bolt 74 passes for ultimate connection to the vacuum inlet tube 16 which, in turn, will be grounded when the system is hooked up.

The purpose in sealing the coils is to permit the body of the pulsator assembly to be operated when wet. Considering one coil and armature assembly it will be appreciated that if the teat cups connected to that coil are submerged in water or cleaning solution the vacuum will draw the water into the corresponding chamber when the coil is energized. When the coil is de-energized the armature will drop down trapping the water in the chamber. When the coil is subsequently energized it will move rapidly upwardly and force some water out of the atmospheric vent to thoroughly clean the vent. This permits the vents to be kept open very simply and allows the entire interior of the pulsator to be cleaned without disassembly.

With the present arrangement the connectors 58 and 60 are respectively adapted for connection to the rear and front teat cups. The respective coils 46 and 48 are alternately energized by the arrangement schematically shown in FIG. 1 where motor 76 rotates the shaft 78 on which the two stacked cams 80, 82 are adjustably mounted to vary the degree of overlap of the lobe portions of the two cams. Both lobes roll against the wheel 84 on the switch actuator to control movement of the switch plunger 88. The switch is a single throw double throw switch and when the plunger is raised in the position shown in FIG. 1 lead 90 may be connected to the line L–1 through the switch and when the lobe depresses the actuator the lead 92 will be connected while lead 90 will be disconnected. Therefore, it will be seen the coils are alternately energized. This has a considerable advantage in that the amount of air being bled into the vacuum system during the rest phase of the milking is cut in half and the load on the vacuum pump remains more uniform with the result that the vacuum fluctuation at the teat cups is far more uniform than with the usual milking system. This promotes proper collapse of the teat cup inflation to provide proper relief of the teat.

A further advantage in the present arrangement is that the amount of overlap of the two cams can be adjusted to energize the coils for different percentages of the elapsed time for one revolution of the cam assembly. Usually a milking system energizes the front and rear teat cups for the same length of time but studies show that about 60% of the milk is in the rear teats with the front teats containing the remaining 40%. Therefore, I prefer to adjust the cam so as to energize the rear coil 60% of the time and the front coil 40% of the time. In this way the front and rear of the udder are milked dry at about the same time and the possible irritation of the front teats by reason of having been milked dry well ahead of the rear teats is eliminated.

In some instances it may be found that 40% milking time on the front teats does not achieve long enough milking time on the front teats and to avoid the cost of going to two separate controls I find that I can further adjust the milking time within reasonable limits by varying the size of the vent for the front teat pulsator assembly. It will be noted that the vent 44 is smaller than the vent 42 and the effect that this achieves can be seen on the graph shown in FIG. 6. In this graph it will be noted that when the coil is energized the vacuum at the teat cup rapidly builds up along the graph portion 94 until the desired vacuum is reached and levels off at 96. If the vent were relatively large the curve would then follow the dotted line portion 98 when the coil was de-energized, and giving a relatively rapid fall-off in vacuum at the teat cups. By reducing the size of the vent the curve can be made to move over to the right to the solid line 100 and it will be noted that the effect is to increase the length of time that vacuum is applied to the teats. This, then, increases the milking phase even though the energized period of time on the coil remains 40%. It will be appreciated that the valleys between the peaks on this graph represent the period of time when the other or rear teat cups are milking.

By providing alternate acting pulsator assemblies for the front and rear cups I have been able to achieve uniform vacuum in the system and far better characteristics as well as being able to adjust the time of milking on the front and rear teats so as to more closely reflect the actual available milk supply. I have also found that by adjusting the orifice size I can further modify the milking characteristics so as to adjust the milking phase even more closely to the type of cow being milked. By providing a control which permits adjusting the energizing time between the front and rear cups further modifications in the milking characteristics can be achieved to again reflect variations in the types of cows. Finally, the present system, being encapsulated, allows the pulsator assembly to be washed in place with the vents being kept open by high velocity jets of water being ejected through the vents during the washing phase.

Although but one embodiment of the present invention has been illustrated and described, it will be apparent to those skilled in the art that various changes and modifications may be made therein without departing from the spirit of the invention or from the scope of the appended claims.

I claim:
1. A milking machine pulsator system comprising a vacuum source, housing means defining two chambers each of which is provided with a vent to atmosphere and a conduit, said vents being of unequal size, said conduits being in open communication with said chambers and adapted for connection to teat cups, a passage in the housing means connected to said vacuum source, a port in each chamber affording communication between the chamber and the passage, independent valve means in each chamber for alternately closing the vent and the port, means for operating each valve means, and timer control means for automatically repetitively and sequentially energizing said operating means, said timer control means including means for relatively adjusting the percentage of time the valve means close their respective vents whereby vacuum may be applied to one conduit for a greater percentage of time than to the other conduit.

2. The pulsator system according to claim 1 wherein the timer control means is arranged to operate the valve means associated with the smaller of said vents to close said vent a smaller percentage of time than is the valve means associated with the other of said vents.

3. The pulsator described in claim 1, wherein the means for operating the valves comprises independent coil means for operating each valve means, and said timer control means including switch means for controlling energization of the coil means, cam means having a lobe which actuates the switch means to alternately energize the coil means, the switch means being actuated by the lobe to energize one coil and acting to energize the other coil during the dwell portion of the cam means, the cam means including two stacked cams of generally similar configuration which are adjustably mounted to vary the degree of overlap of the lobe portions to permit adjustment of the effective angular duration of the composite lobe portion and thereby adjust the percentage of time the coils are energized.

4. The pulsator according to claim 3 wherein the switch controlling the coil associated with the valve controlling the smaller of said vents is energized by said timer control means a smaller percentage of time than is the coil associated with the valve controlling the other of said vents.

References Cited by the Examiner

UNITED STATES PATENTS

| 1,379,800 | 5/1921 | Casarotti | 137—624.13 |
| 1,413,546 | 4/1922 | Warner | 119—14.28 |
| 1,924,931 | 8/1933 | Hulbert | 119—14.28 |
| 2,418,776 | 4/1947 | Kopplin | 137—624.17 X |
| 2,660,190 | 11/1953 | Blondel | 137—624.2 X |
| 2,912,007 | 11/1959 | Johnson | 137—625.64 X |

ISADOR WEIL, *Primary Examiner.*

ALAN COHAN, *Examiner.*